United States Patent [19]
Green

[11] 3,806,303
[45] Apr. 23, 1974

[54] CLOSURES FOR PRESSURE VESSELS

[75] Inventor: Derek Green, Lytham-St.-Annes, England

[73] Assignee: United Kingdom Atomic Energy Authority, London, England

[22] Filed: Nov. 2, 1972

[21] Appl. No.: 303,048

[30] Foreign Application Priority Data
Nov. 29, 1971 Great Britain.................... 55413/71

[52] U.S. Cl............... 425/451, 425/247, 425/405 H
[51] Int. Cl............................................... B29c 1/16
[58] Field of Search ....... 425/405, 405 H, 406, 242, 425/450, 451, 247

[56] References Cited
UNITED STATES PATENTS
3,530,551   9/1970   Haes et al...................... 425/405 H
3,543,345   12/1970  Boyer............................. 425/405 H
3,566,450   3/1971   Roberts.......................... 425/405 H
3,618,164   11/1971  Rietmann....................... 425/405 H
3,664,801   5/1972   Martrier......................... 425/405 H Primary Examiner—Robert L. Spicer, Jr.
Attorney, Agent, or Firm—Larson, Taylor & Hinds

[57] ABSTRACT

A closure member for a pressure vessel is held in the bore in the vessel by a slidable locking member. The locking memer is reciprocable laterally between a first position at which it holds the closure member in the bore and a second position clear of the closure member to allow the latter to be removed from the bore in the pressure vessel. When in the first position a passageway in the locking member couples a pressure fluid supply line to a passageway in the closure member leading into the bore of the vessel.

4 Claims, 1 Drawing Figure

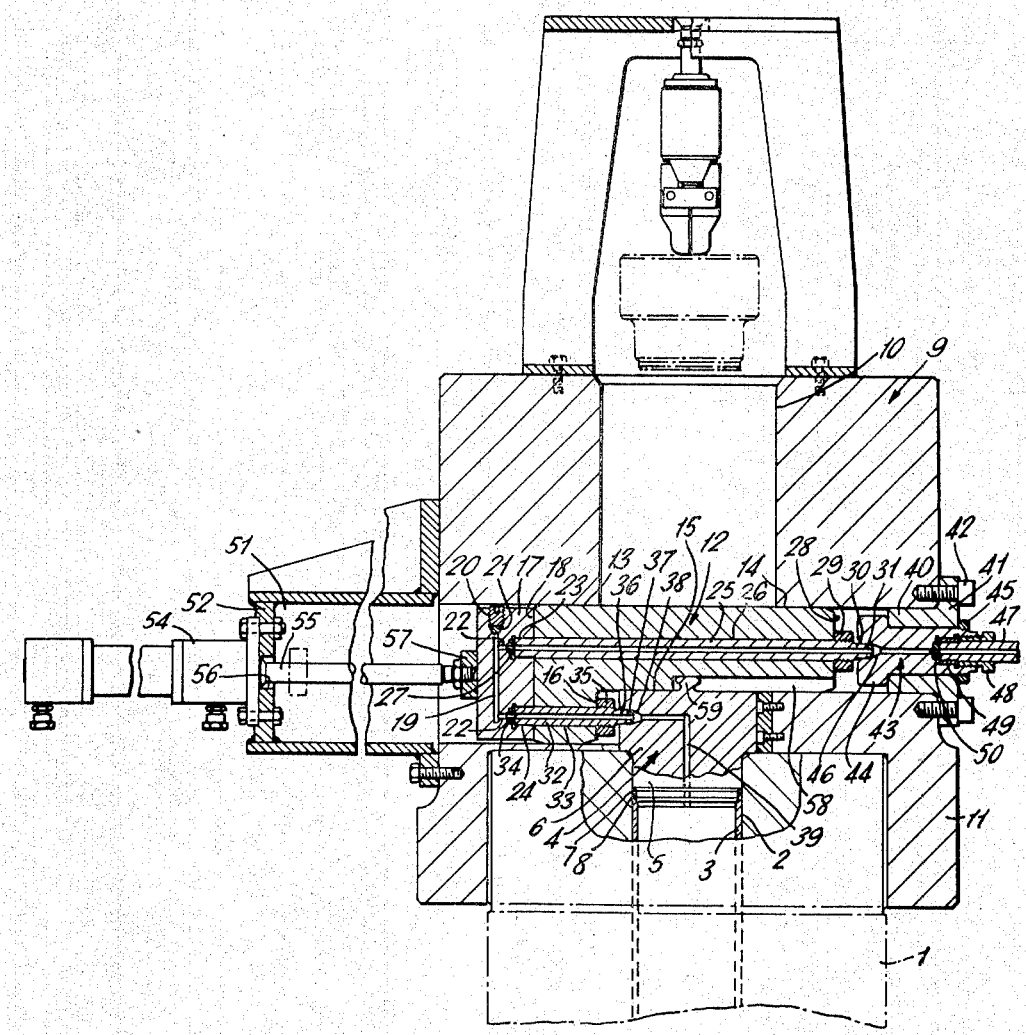

CLOSURES FOR PRESSURE VESSELS

This invention relates to an assembly for closing an end of a pressure vessel.

The invention relates particularly to a closure assembly for a vessel in which a workpiece is subjected to a forming operation by pressurisation of fluid in the pressure vessel about the workpiece. For example in the hydrostatic extrusion process hydraulic liquid is pressurised in a vessel about a workpiece contained in the vessel so as to cause extrusion of the workpiece from the vessel through a die.

In order to provide rapidity in a commercial operation of such a forming process it is desirable to provide end closure means for the pressure vessel which are expeditiously removable and replaceable. Provision has also to be made for the supply of fluid under pressure to the vessel and in one arrangement this is achieved by the provision of a transverse drilling in the wall of the pressure vessel. However in this arrangement the presence of the transverse drilling is a source of weakness in the pressure vessel and limits the pressure which can be applied in the vessel. It has also been proposed to supply pressurised fluid to a pressure vessel through the end closure means for the vessel. However such provision of fluid supply means in conjunction with the end closure means can be a hinderance to removal and replacement of the end closure means for the pressure vessel.

According to the present invention an assembly for closing an end of a pressure vessel comprises a closure member fitting the end of the bore in the pressure vessel, and a locking member for the closure member movable between a first position holding the closure member in the bore of the pressure vessel and a second position allowing removal of the closure member from the bore of the pressure vessel, the closure member having a passageway for conveying pressure fluid into the bore of the pressure vessel and the locking member having a complementary passageway which co-operates with and couples the passageway in the closure member with an external pressure fluid supply when the locking member is in the first position holding the closure member in the bore of the pressure vessel.

Coupling means are suitably provided for connecting the two ends of the passageway in the locking member one with the corresponding end of the passageway in the closure member and the other with the fluid supply line, such connection being effected by movement of the locking member from the position allowing removal of the closure member from the bore of the pressure vessel to the position holding the closure member in the end of the bore of the pressure vessel. The coupling means are preferably of plug and socket form.

In a particular form of the invention the locking member is a bar mounted in support means so as to be movable in a direction parallel to the end face of the pressure vessel into and from a position lying behind and thereby holding the closure member in the end of the bore of the pressure vessel. A plug member is provided at each end of the passageway in the locking member the plug members facing in the direction in which the locking member is movable towards the position locking the closure member in the end of the bore of the pressure vessel, the closure member having transverse inlet socket connecting with the passageway therein and corresponding to the plug member at the related end of the passageway in the locking member, the fluid supply line having an outlet socket corresponding to the plug member at the other end of the passageway in the locking member. In the above arrangment movement of the locking member from the retracted position allowing removal of the closure member from the pressure vessel into the position locking the closure member in the bore of the pressure vessel results in coupling of the plug members of the locking member with the inlet socket of the closure member and the outlet socket of the fluid supply line.

One embodiment of the invention will now be described by way of example with reference to the single FIGURE of the accompanying drawing which is a longitudinal sectional elevation.

In the drawing there is shown a pressure vessel 1 having a cylindrical bore 2 which is fitted with a liner sleeve 3. A closure member 4 is fitted at the upper end of the bore 2 of the pressure vessel 1. The closure member 4 has a cylindrical body part 5 and a larger diameter cylindrical head 6, the body part 5 being sealed in the bore 2 of the pressure vessel 1 by a copper mitre ring 7 and a rubber O-ring 8. A cylindrical block 9 with a central bore 10 has a lower end skirt 11 at which the block 9 is screwed onto the upper end of the pressure vessel 1.

A locking member 12 for the closure member 4 is slidable in diametrically opposed slots 13 and 14 in the block 9. The locking member 12 is formed to have a flat longitudinal face 15 and an intermediate transverse face 16. An end plate 17 is located at the left hand end face 18 of the locking member 12. The end plate 17 has a transverse drilling 19 which is sealed at its outer end by a threaded plug 20 and a conical sealing member 21. Short longitudinal drilling 22 lead from the transverse drilling 19 in the end plate 17 to threaded sockets 23 and 24 in the face of the end plate 17 adjoining the left hand end face 18 of the locking member 12. A pipe 25 is fitted in a drilling 26 extending through the full length of the locking member 12. The left hand end of the pipe 25 is screwed into the socket 23 in the end plate 17, the end of the pipe 25 being sealed in the socket 23 by a cone faced sealing ring 27. The end of the pipe 25 projecting beyond the right hand end face 28 of the locking member 12 is fitted with a threaded clamping sleeve 29 and is tapered to form a plug member 30 which is fitted with a sealing ring 31. A shorter pipe 32 is fitted in a drilling 33 extending through the locking member 12 between the transverse face 16 and the left hand end face 18 of thhe locking member 12. The left hand end of the pipe 32 is screwed into the socket 24 in the end plate 17, the end of the pipe 32 being sealed in the socket 24 by a cone faced sealing ring 34. The end of the pipe 32 projecting beyond the transverse face 16 of the locking member 12 is fitted with a threaded clamping sleeve 35 and is tapered to form a plug member 36 which is fitted with a sealing ring 37.

The head 6 of the closure member 4 has a transverse socket 38 corresponding to the plug member 36 formed by the end of the pipe 32 which projects from the locking member 12, the socket 38 connecting with a passageway 39 leading through the closure member 4 into the bore 2 of the pressure vessel 1.

A bush 40 having an end flange 41 is fitted within the right hand slot 14 in the block 9, the bush 30 being attached to the block 9 ring the end flange 41 by bolts 42.

The bush 40 houses a socket member 43 which has an enlarged head 44 and is located in the bush 40 by a threaded clamping ring 45. A socket 46 in the head 44 of the socket member 43 corresponds to the plug member 39 formed by the end of the pipe 25 which projects from the locking member 12. A fluid supply pipe 47 is connected with the socket member 43 by threaded coupling sleeve 48 the end of the pipe 47 being sealed in a counterbore 49 on the socket member 43 by a cone faced sealing ring 50.

A framework 51 having an end plate 52 is attached to the block 9 by bolts 53. The framework 51 is located at the position of the slot 13 in the block 9. A hydraulic cylinder 54 is mounted on the end plate 52 of the framework 51. The hydraulic cylinder 54 has a shaft 55 which operates through a hole 56 in the end plate 52 of the framework 51. The end of the shaft 55 is screwed into a threaded bush 57 which is welded to the end plate 17 of the locking member 12.

In the position shown in the drawing the closure member 4 is held in place in the end of the bore 2 of the cylinder 1 by the locking member 12. The longitudinal face 15 of the locking member 12 bears against the end face of the head 6 of the closure member 4. The face 15 of the locking member 12 has a longitudinal slot 58 to accommodate a lifting knob 59 on the head 6 of the closure member 4. In this position of the locking member 12 the plug members 30 and 36, which are formed by the ends of the pipes 25 and 32 projecting from the locking member 12, are coupled respectively with the socket 46 in the head of the socket member 43 and with the socket 38 in the head 6 of the closure member 4. Thus liquid under pressure can be fed from the supply line 47, into the bore 2 of the pressure vessel 1 through the pipe 25 in the locking member 12, the transverse drilling 19 in the end plate 17, the pipe 32 in the locking member 12 and the passageway 39 in the closure member 4. By way of example the pressure applied in liquid in the pressure vessel 1 may be used for hydrostatic extrusion of a billet from the pressure vessel 1. After extrusion of the billet the end closure member 4 has to be removed from the pressure vessel 1 so that the billet discard can be extracted from the pressure vessel 1 and replaced by a fresh billet. Removal of the closure member 4 from the pressure vessel 1 is enabled by withdrawal of the locking member 12 using the hydraulic cylinder 54. The locking member 12 is withdrawn clear of the head 6 of the closure member 4, leaving the closure member 4 free to be lifted by a grab engaging with the lifting knob 59 on the head 6 of the closure member 4. Withdrawal of the locking member 12 also disconnects the plug members 30 and 36 from the sockets 46 and 38. After removing the billet discard from the pressure vessel 1 and charging a fresh billet into the pressure vessel 1 the closure member 4 is refitted in the end of the bore 2 of the pressure vessel 1 and locked in position by advancing the locking member 12.

I claim:

1. An assembly for closing an end of a pressure vessel comprising a closure member fitting the end of the bore in the pressure vessel and a locking member for the closure member movable between a first position holding the closure member in the bore in the pressure vessel and a second position allowing removal of the closure member from the bore of the pressure vessel, a passageway in the closure member for conveying pressure fluid into the bore of the pressure vessel and a complementary passageway in the locking member which cooperates with and couples the passageway in the closure member with an external pressure fluid supply when the locking member is in said first position.

2. An assembly for closing an end of a pressure vessel according to claim 1 in which the locking member is reciprocable between said first and second positions in a bore extending transverse to the bore in the pressure vessel, a face of the locking member slidingly engaging an end face of the closure member.

3. An assembly for closing an end of a pressure vessel according to claim 1 including a probe at each end of the passageway in the locking member, a corresponding socket in each of the passageway in the closure member and a pressure fluid supply line, said probes sealingly engaging said sockets when the locking member is in said first position.

4. An assembly for closing an end of a pressure vessel according to claim 3 in which the probes project from end faces of the locking member which are the leading end faces when the locking member is moving from said second to said first position whereby the probes positively engage their associated sockets.

* * * * *